US011509178B2

(12) United States Patent
Kuhl et al.

(10) Patent No.: US 11,509,178 B2
(45) Date of Patent: Nov. 22, 2022

(54) ELECTRIC MACHINE DISTRIBUTED COOLING SYSTEM AND METHOD (71) Applicant: Deere & Company, Moline, IL (US)

(72) Inventors: Marcus L. Kuhl, Cedar Falls, IA (US); Clayton P. Neumann, Cedar Falls, IA (US); Robert K. Salamon, Briggsville, WI (US)

(73) Assignee: Deere & Company, Moline, IL (US)

( * ) Notice: Subject to any disclaimer, the term of this patent is extended or adjusted under 35 U.S.C. 154(b) by 395 days.

(21) Appl. No.: 16/570,416

(22) Filed: Sep. 13, 2019

(65) Prior Publication Data
US 2021/0057948 A1 Feb. 25, 2021

Related U.S. Application Data (60) Provisional application No. 62/889,258, filed on Aug. 20, 2019.

(51) Int. Cl.
*H02K 1/32* (2006.01)
*B60K 1/00* (2006.01)
(Continued)

(52) U.S. Cl.
CPC ............... *H02K 1/32* (2013.01); *B60K 1/00* (2013.01); *H02K 1/276* (2013.01); *H02K 7/006* (2013.01);
(Continued)

(58) Field of Classification Search
CPC ........ H02K 1/32; H02K 1/276; H02K 1/2766; H02K 21/14; H02K 7/006; H02K 9/19;
(Continued)

(56) References Cited

U.S. PATENT DOCUMENTS 5,703,421 A * 12/1997 Durkin ............... H02K 1/20
310/58
5,782,083 A 7/1998 Hodge
(Continued)

FOREIGN PATENT DOCUMENTS

DE 102004049795 A1 11/2005
DE 112012000077 T5 6/2013
(Continued)

OTHER PUBLICATIONS

European Search Report issued in counterpart application No. 20189638.8 dated Dec. 10, 2020 (08 pages).

*Primary Examiner* — Alex W Mok (57) ABSTRACT

An electric machine including a distributed cooling system is disclosed. The electric machine includes a housing, a stator assembly, a rotor assembly, and a distributed cooling system. The distributed cooling system comprising at least one inlet, a first passage, a second passage, and a third passage. The first passage extending axially in a first direction through at least a portion of the rotor shaft to direct a flow of coolant in the first direction. A second passage fluidly coupled to the first passage extending in a second direction through at least a portion of the rotor shaft between a receiving end and a distributing end. At least one third passage fluidly coupled to the second passage extending between a first end and a second end and distributes coolant received from the second passage to at least one of the first end or the second end into the stator assembly.

18 Claims, 9 Drawing Sheets (51) Int. Cl.
  *H02K 1/27* (2022.01)
  *H02K 21/14* (2006.01)
  *H02K 7/00* (2006.01)
  *H02K 1/276* (2022.01)
  *B62D 49/00* (2006.01)

(52) U.S. Cl.
  CPC ........ *H02K 21/14* (2013.01); *B60K 2001/006* (2013.01); *B60Y 2200/221* (2013.01); *B60Y 2306/05* (2013.01); *B60Y 2400/60* (2013.01); *B62D 49/00* (2013.01)

(58) Field of Classification Search
  CPC ............... B60K 1/00; B60K 2001/006; B60Y 2200/221; B60Y 2306/05; B60Y 2400/60; B62D 49/00
  USPC .......................................................... 310/52
  See application file for complete search history.

(56) References Cited

U.S. PATENT DOCUMENTS

| | | |
|---|---|---|
| 6,437,468 B2 | 8/2002 | Stahl et al. |
| 6,903,471 B2 | 6/2005 | Arimitsu et al. |
| 7,009,317 B2 | 3/2006 | Cronin et al. |
| 7,462,963 B2 | 12/2008 | Ishihara et al. |
| 7,591,147 B2 | 9/2009 | Masoudipour et al. |
| 7,675,209 B2 | 3/2010 | Masoudipour et al. |
| 8,604,651 B2 | 12/2013 | Himmelmann |
| 8,729,751 B2 | 5/2014 | Telakowski et al. |
| 8,963,384 B2 * | 2/2015 | Kirkley, Jr. ............. H02K 1/32 310/58 |
| 8,970,075 B2 | 3/2015 | Rippel et al. |
| 9,627,943 B2 * | 4/2017 | Tokunaga ................ H02K 1/32 |
| 9,793,767 B2 | 10/2017 | Severson et al. |
| 9,806,572 B2 * | 10/2017 | Yamagishi ............... H02K 9/19 |
| 9,917,486 B2 * | 3/2018 | Kirkley, Jr. .............. H02K 1/32 |
| 2012/0318479 A1 | 12/2012 | Chang et al. |
| 2016/0190878 A1 * | 6/2016 | Saari ....................... H02K 9/04 310/59 |
| 2017/0012500 A1 * | 1/2017 | Brauer .................. H02K 9/193 |

FOREIGN PATENT DOCUMENTS

| | | |
|---|---|---|
| DE | 102012223372 A1 | 6/2014 |
| DE | 102017202752 A1 | 8/2018 |
| EP | 3382858 A1 | 10/2018 |
| WO | 2016206342 A1 | 12/2016 |

* cited by examiner

ELECTRIC MACHINE DISTRIBUTED COOLING SYSTEM AND METHOD

RELATED APPLICATION

This application claims priority to U.S. Provisional Application No. 62/889,258, titled "Electric Machine Distributed Cooling System and Method," filed Aug. 20, 2019, which is hereby incorporated by reference in its entirety.

FIELD OF THE DISCLOSURE

The present disclosure relates generally to electric machine cooling systems, and, more particularly, to a cooling system and method that provides distributed cooling of an electric machine.

BACKGROUND OF THE DISCLOSURE

In high performance electric machine applications, effective thermal management is critical in ensuring optimal machine performance. Increased power densities and efficiency requirements of electric machines lead to increases in heat densities that result in undesirable thermal conditions. For example, excessive heat generation resulting from losses within the stator windings, laminations, or magnets is distributed to a variety of machine components, which causes adverse temperature effects. These temperature effects can include magnet demagnetization, component failure, as well as insulation damage of the machine.

To address such concerns and to enhance thermal designs of the electric machines, a variety of conventional cooling techniques have been employed. For example, some conventional approaches employ the use of passive cooling techniques such as rotor rotation, convection cooling, or fin cooling to reduce adverse temperature effects within the electric machine. Other approaches employ active cooling techniques such as fan or air cooling to enhance heat transfer.

Drawbacks to such approaches include inefficient and limited cooling of the electric machines, restricted heat transfer, degraded system performance. Therefore, to overcome the drawbacks of conventional techniques, there is a need in the art for a more robust and improved cooling design to more effectively cool electric machines and increase system performance.

SUMMARY OF THE DISCLOSURE

According to an aspect of the present disclosure, an electric machine with distributed cooling is disclosed. The electric machine includes a stator assembly, a rotor assembly including a rotor shaft and a rotor core, and a distributed cooling system. The distributed cooling system including at least one inlet arranged on an end of the rotor shaft, a first passage, a second passage, and at least one third passage. The first passage extending axially in a first direction through at least a portion of the rotor shaft to direct a flow of coolant received from the inlet in the first direction. The second passage fluidly coupled to the first passage and extends in a second direction through at least a portion of the rotor shaft between a receiving end and a distributing end. The second passage is configured to direct the flow of coolant in the second direction for distribution at the distributing end. The at least one third passage fluidly coupled to the second passage, the at least one third passage extending between a first end and a second end, wherein the third passage is configured to distribute coolant received from the second passage to at least one of the first end or the second end into the stator assembly.

According to another aspect of the present disclosure, a work vehicle is disclosed. The work vehicle includes a vehicle frame, an engine, a transmission; and an electric machine operatively coupled to at least one of the engine or transmission. The electric machine includes a stator assembly, a rotor assembly having a rotor core and a rotor shaft, and a distributed cooling system. The distributed cooling system including at least one inlet arranged on an end of the rotor shaft, a first passage, a second passage, and at least one third passage. The first passage extending axially in a first direction through at least a portion of the rotor shaft to direct a flow of coolant received from the inlet in the first direction. The second passage fluidly coupled to the first passage and extends in a second direction through at least a portion of the rotor shaft between a receiving end and a distributing end. The second passage is configured to direct the flow of coolant in the second direction for distribution at the distributing end. The at least one third passage fluidly coupled to the second passage, the at least one third passage extending between a first end and a second end, wherein the third passage is configured to distribute coolant received from the second passage to at least one of the first end or the second end into the stator assembly.

According to other aspects of the present disclosure, a method is disclosed. The method includes providing a stator assembly and a rotor assembly within a housing, the rotor assembly having a rotor core relatively arranged with respect to a rotor shaft. Arranging a first passage to extend axially in a first direction through the rotor shaft to direct a flow of coolant in the first direction. Arranging a second passage in fluid communication with the first passage to extend in a second direction through the rotor shaft between a receiving end and a distributing end, wherein the second passage is configured to direct the flow of coolant in the second direction. Arranging a third passage in fluid communication with the second passage to extend between a first end and a second end through the rotor core, wherein the third passage is configured to distribute coolant received from the second passage to at least one of the first end or the second end into the stator assembly.

Other features and aspects will become apparent by consideration of the detailed description and accompanying drawings.

BRIEF DESCRIPTION OF THE DRAWINGS

The detailed description of the drawings refers to the accompanying figures in which.

Like reference numerals are used to indicate like elements through the several figures.

DETAILED DESCRIPTION OF THE DRAWINGS

Figure 1:
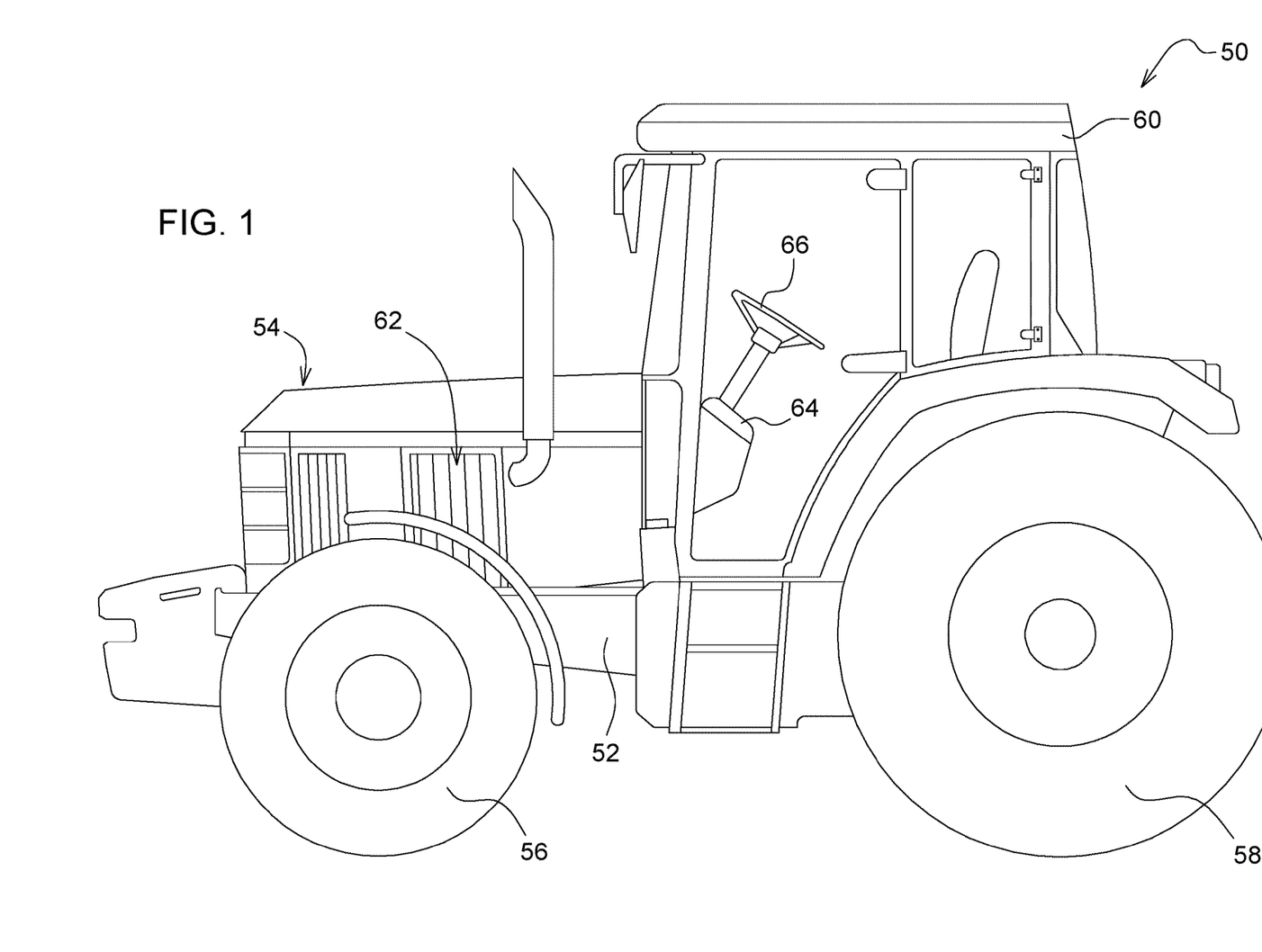
FIG. 1 is a side view of a work vehicle according to an embodiment.
Figure 2:
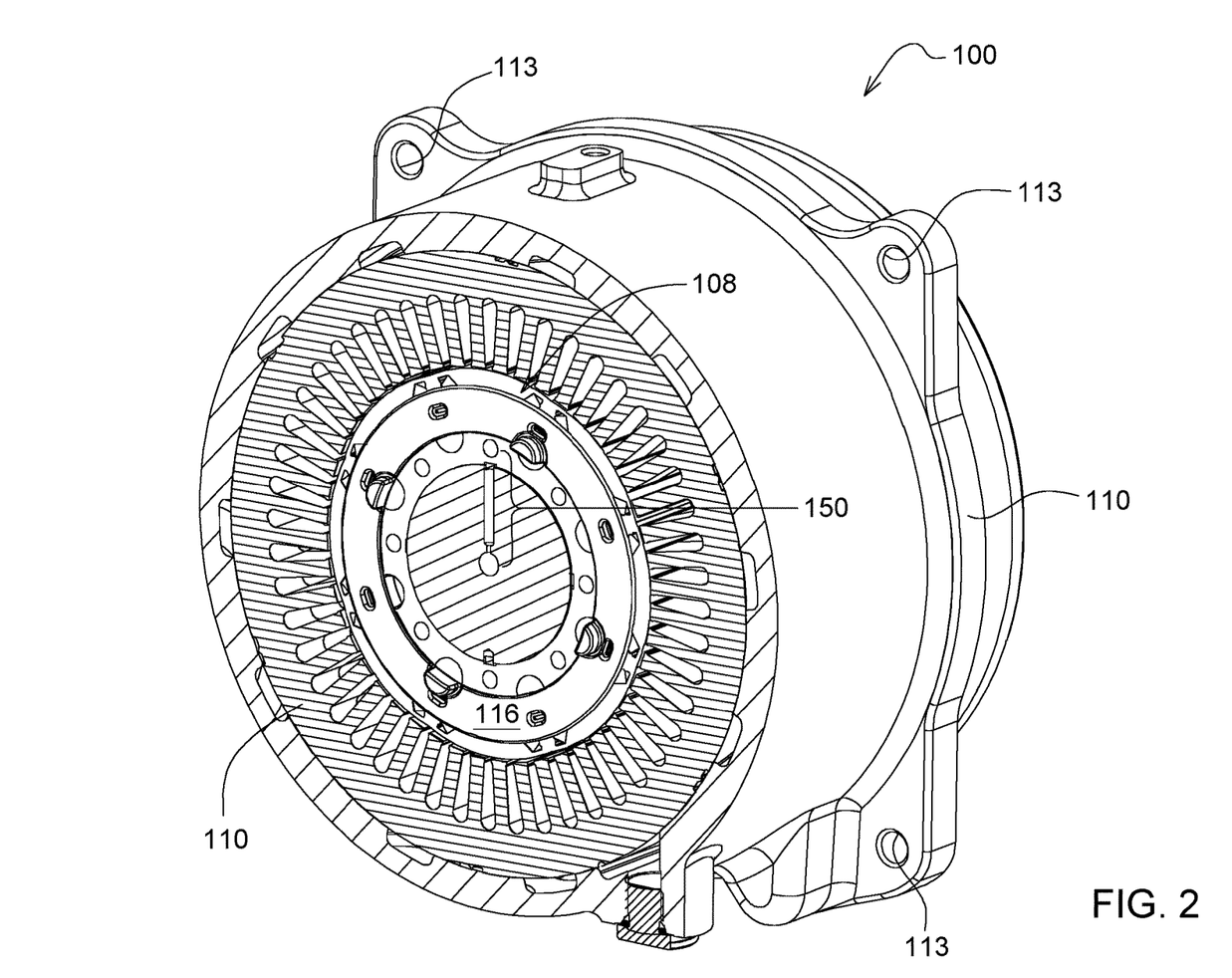
FIG. 2 is a cross-sectional view of an electric machine according to an embodiment.

Referring to FIG. 1, a work vehicle 50 is shown according to an embodiment. Although in FIG. 1 the work vehicle 50 is shown as comprising a tractor, it should be noted that, in other embodiments, the work vehicle 50 can vary according to application and/or specification requirements. For example, in other embodiments, the work vehicle 50 can comprise tracked or unmanned vehicles, and may also comprise road graders, dozers, loaders, excavators, forestry equipment, or turf vehicles, with embodiments discussed herein being merely for exemplary purposes to aid in an understanding of the present disclosure.

As shown in FIG. 1, the work vehicle 50 can comprise a vehicle frame 52 supported on a pair of front wheels 56 and rear wheels 58. An operator cab 60 can be mounted on a rear region of the vehicle frame 52 and can comprise a variety of controls such as steering wheel 66 to allow a vehicle operator to control functions and operations of the work vehicle 50. A user interface 64 can be arranged in the operator cab 60 and can comprise one or more display screens that provide machine data, image data, or selectable menus for controlling various features of the work vehicle 50. An engine 62 can be mounted to the vehicle frame 52 within a hood assembly 54 to supply power for all driven components of the work vehicle 50. For example, the engine 62 can be configured to drive a transmission (not shown) that drives the rear wheels 58 at various selected speeds in forward or reverse modes.

Referring to FIGS. 2-5, an electric machine 100 having a cooling system 150 that provides distributed cooling of the electric machine 100 is shown according to an embodiment. The electric machine 100 can be arranged within the work vehicle 50. For example, in some embodiments, the electric machine 100 can be coupled to the engine 62 or transmission of the work vehicle 50. The electric machine 100 can comprise a housing 102 encasing a stator assembly 110 and a rotor assembly 108. The housing 102 can comprise an outer cylindrical surface 103 having a mounting interface 112 removably coupled to or integrally formed therein. An electrical connector 133 can be arranged on the housing 102 to supply three-phase power to the electric machine 100. Although in FIG. 2, the mounting interface 112 is shown as comprising a plurality of mounting holes 113 which are sized to receive one or more fasteners or similar connectors, in other embodiments, the mounting interface 112 can comprise a variety of coupling features and mechanisms based on the electric machine design.

Figure 3:
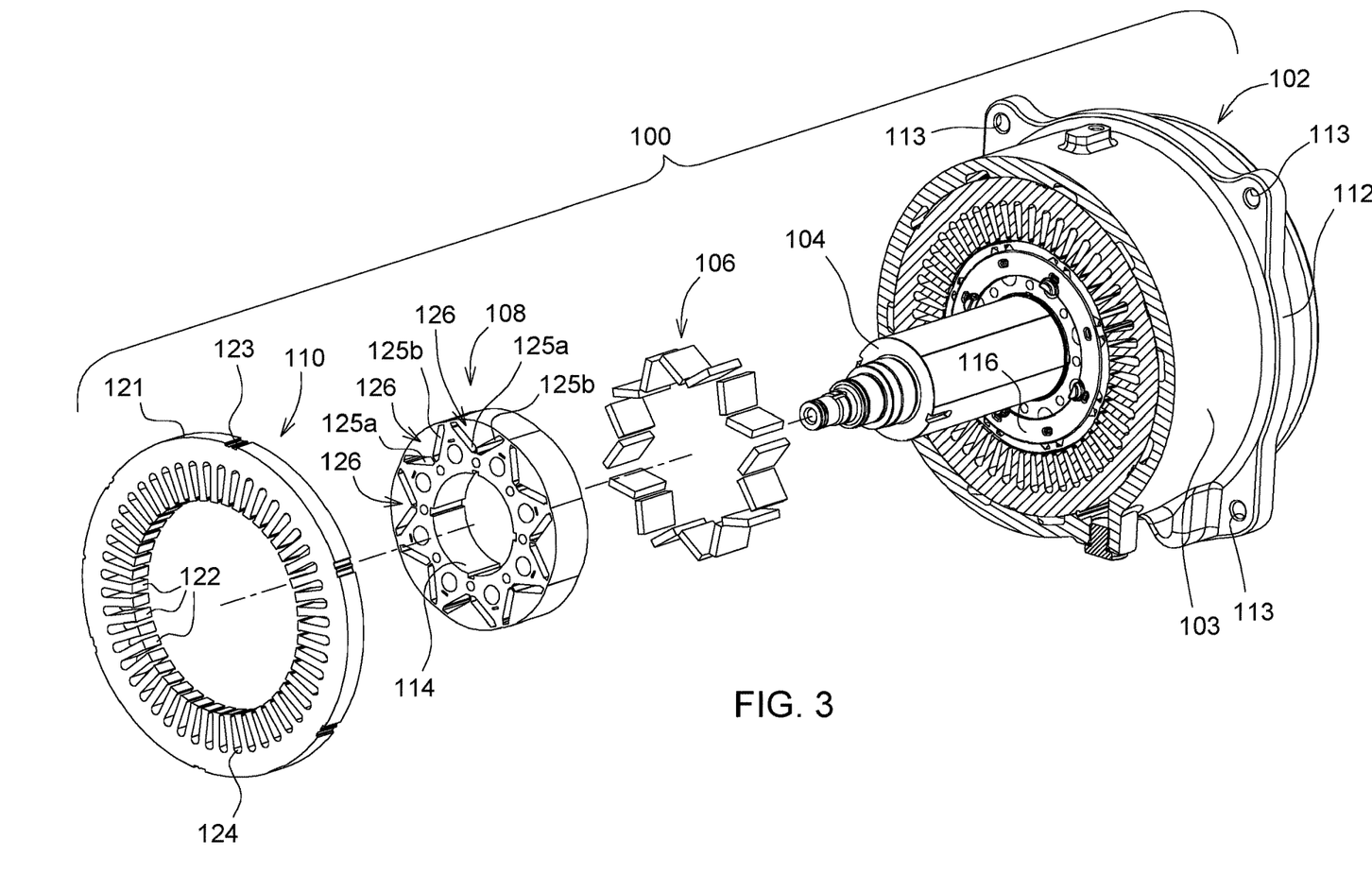
FIG. 3 is an expanded perspective view of the electric machine of FIG. 1 according to an embodiment.
Figure 4:
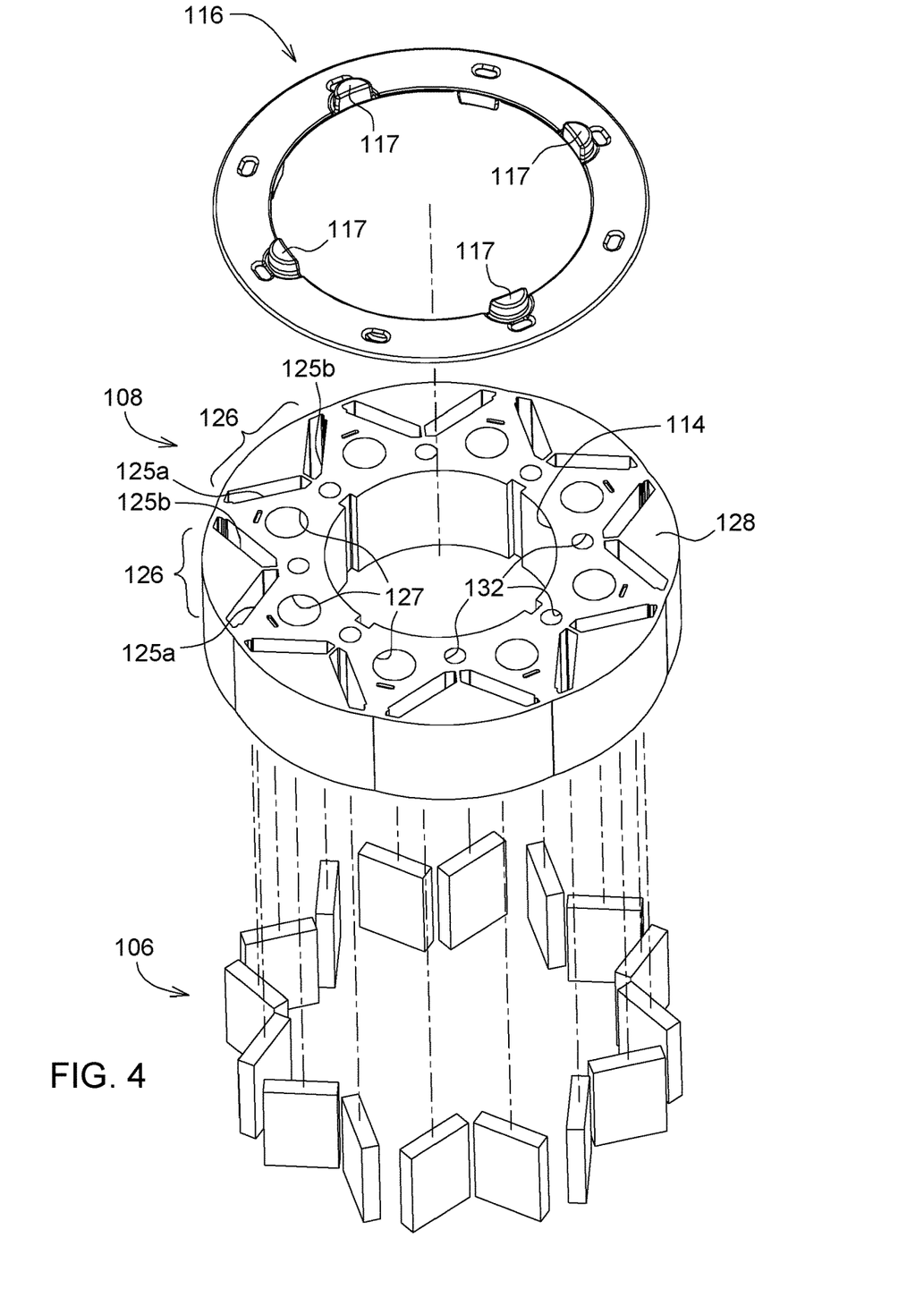
FIG. 4 is a side cross-sectional view of the electric machine of FIG. 1 according to an embodiment.

In some embodiments, the stator assembly 110 can comprise a plurality of stator laminations 120 adjacently arranged to define a stator core 109, with each having generally cylindrical configurations. In other embodiments, the stator assembly 110 can comprise a solid or split core element, with FIG. 3 being but one exemplary embodiment. As shown in FIG. 3, each of the plurality of stator laminations 120 can comprise n number of slots 122 circumferentially spaced and aligned about an inner surface 124, with each of the slots 122 being dimensioned and sized to accommodate one or more motor windings that extend from the slots 122 to form end turns 142 (refer, e.g., to FIGS. 5 and 6). In some embodiments, one or more weld structures 123 can be formed in or arranged on an outer surface 121 of each of the plurality of stator laminations 120 to provide a more secure bonding connection between the stator laminations 120.

The rotor assembly 108 can comprise a rotor shaft 104 and, similar to the stator assembly 110, a plurality of stacked laminations (i.e., rotor laminations 118), which are adjacently arranged in compact relation to one another to define a rotor core 107. Each of the plurality of rotor laminations 118 can comprise a shaft receiving opening 114 that is coaxially aligned with an adjacent opening and sized to receive the rotor shaft 104. Additionally, each of the plurality of rotor laminations 118 can comprise one or more field generation structures 126 that are equidistantly spaced and symmetrically arranged relative to one another about each of the rotor laminations 118. The one or more field generation structures 126 can comprise at least two cavities 125a, 125b that are sized to receive one or more magnetic elements 106 (e.g., permanent magnets). In the non-limiting exemplary embodiment of FIG. 3, the cavities 125a, 125b can be arranged in a generally v-shaped configuration to allow for the placement of each of the magnetic elements 106 in alternating polarity for the inducement of an alternating magnetic field.

Figure 5:
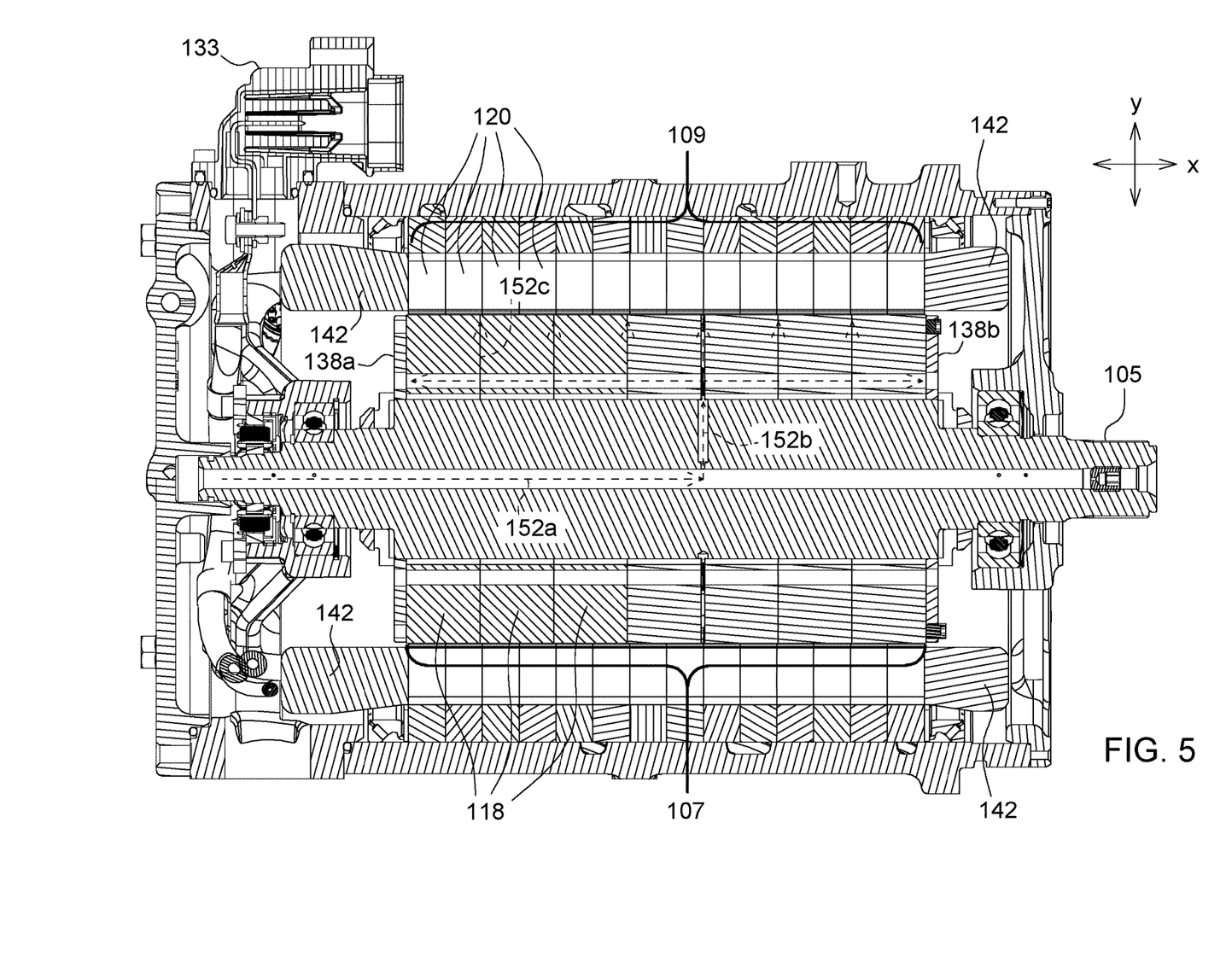
FIG. 5 is a perspective cross-sectional view of the electric machine of FIG. 1 according to an embodiment.

As shown in FIG. 5, at least two cooling plates 138a, 138b (i.e., end plates) can be arranged at opposing ends of the rotor core 107 to facilitate cooling of the end turns 142 as coolant exits the rotor assembly 108. For example, coolant exiting the rotor core 107 is conveyed through the cooling plates 138a and 138b to the stator windings (not shown) and end turns 142. Each of the cooling plates 138a, 138b can be identical and can comprise surface designs including openings and apertures (e.g., 162, 164) that matingly align with those arranged on the rotor laminations 118 (refer, e.g., to FIG. 6).

In some embodiments, a spacer disc 116 can be integrally or removably coupled to an end face 128 of one or more of the rotor laminations 118. For example, the spacer disc 116 can comprise a plurality of coupling elements 117 that are designed for mating engagement with spacer receiving openings 134 arranged in or on the end face 128. As shown in FIG. 3, the spacer disc 116 can be concentrically arranged relative to the rotor shaft 104 and positioned to cover each of the field generation structures 126. Although in embodiments herein, the spacer disc 116 is shown as including a generally circular configuration, it should be noted that, in other embodiments, the geometrical configuration of the spacer disc 116 can vary. For example, in other embodiments, the spacer disc 116 can be sized smaller or larger according to design and specification requirements.

The cooling system 150 can comprise a plurality of cooling passages 152 arranged in fluid communication with one another to distribute a supply of coolant (e.g., oil or other suitable cooling fluids) through the stator and rotor assemblies 104, 106. For example, as will be discussed in further detail with reference to FIGS. 6-8, each of the plurality of cooling passages 152 can be arranged such that coolant is distributed in a specific direction and through a designated section of the stator and rotor assemblies 106, 108.

As will be appreciated by those skilled in the art, FIGS. 1-5 are provided for illustrative and exemplary purposes only and are in no way intended to limit the present disclosure or its applications. In other embodiments, the arrangement and/or structural configuration of the electric machine 100 and cooling system 150 can vary. For example, in some embodiments, the cooling channel 150 can comprise fewer or more cooling passages or distribution channels. Additionally, in other embodiments, the internal circuitry and component arrangement of the electric machine 100 can vary according to design and/or specification requirements.

Figure 6:
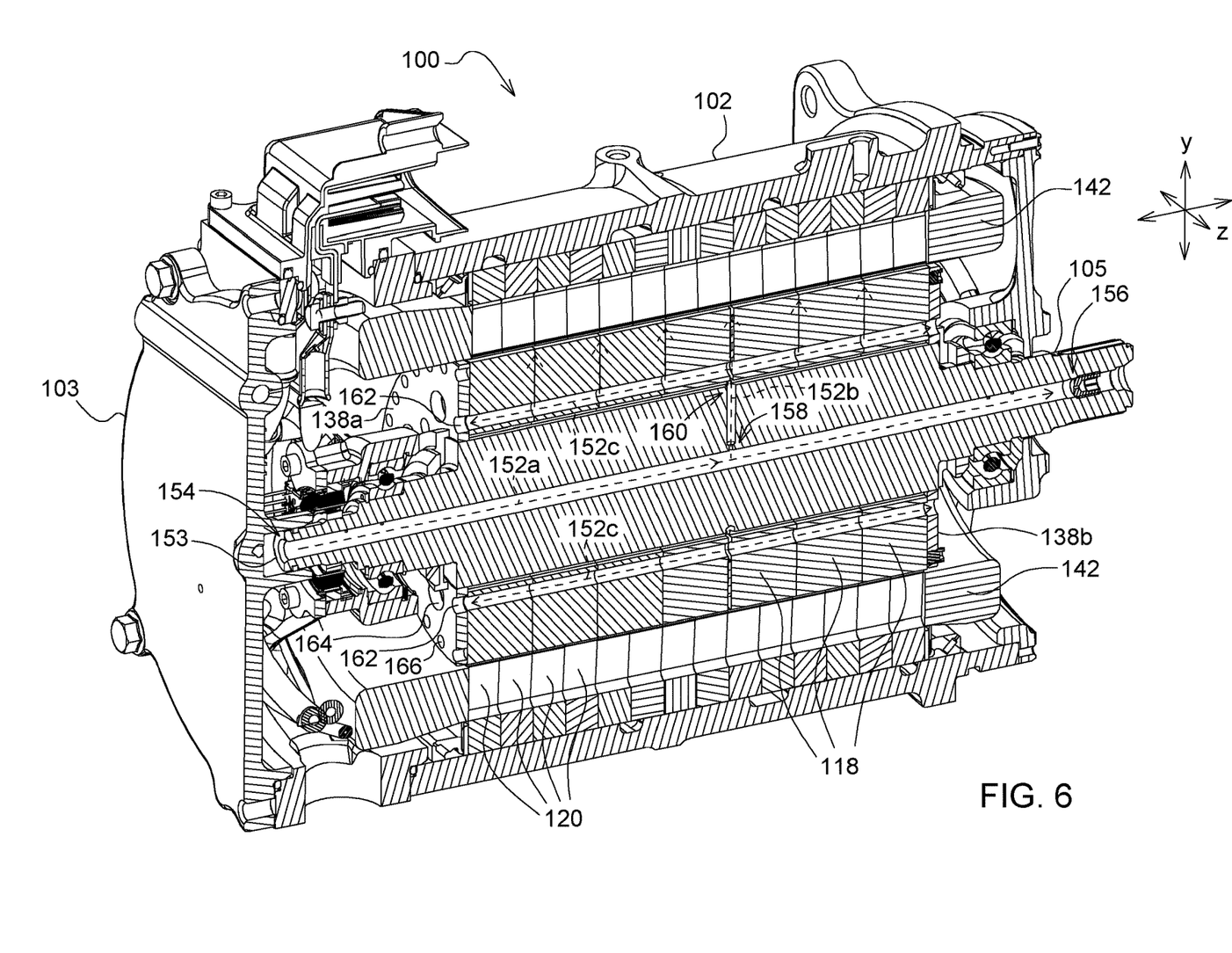
Figure 7A:
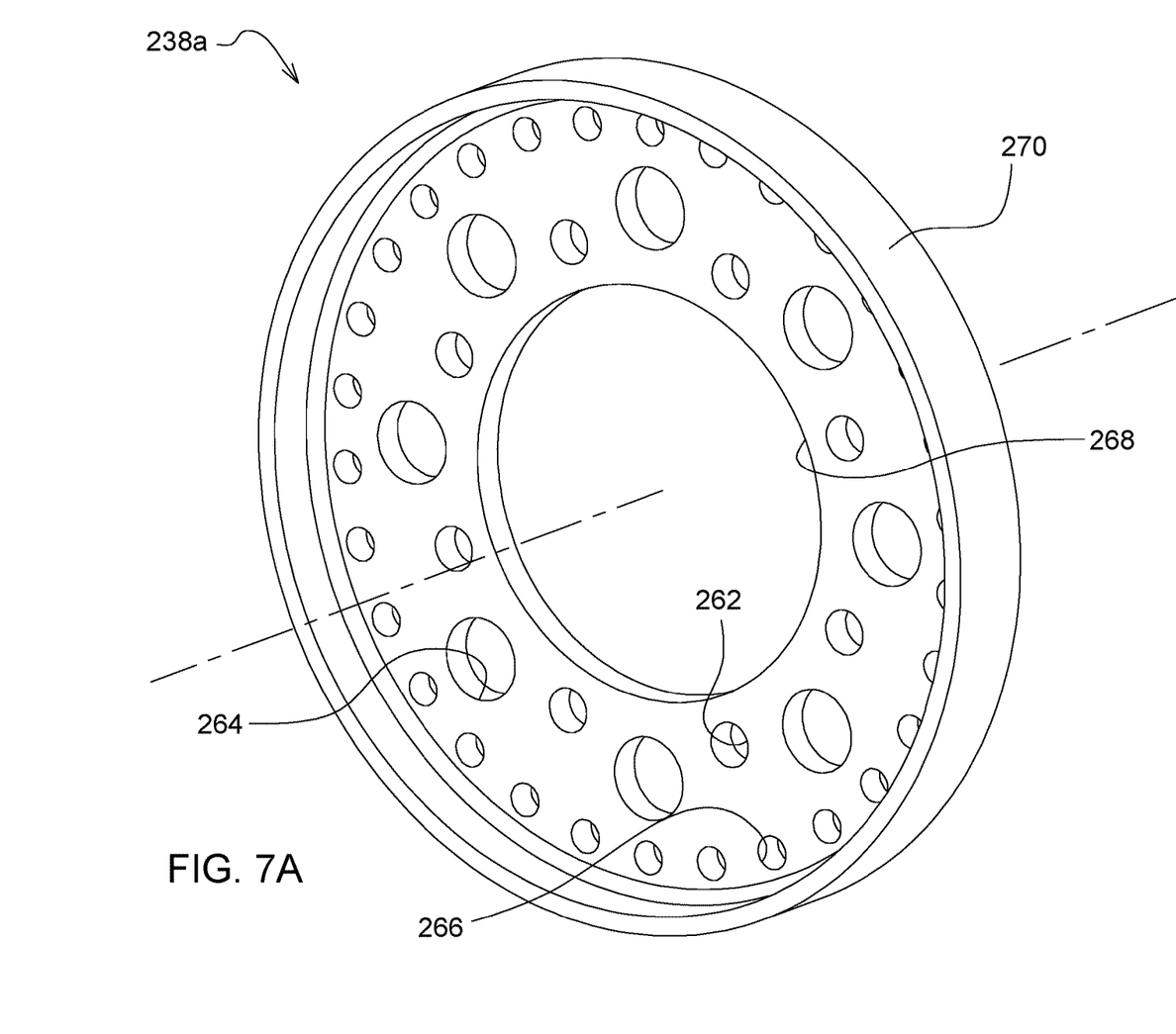
FIG. 7A is a perspective view of a cooling plate according to an embodiment.
Figure 7B:
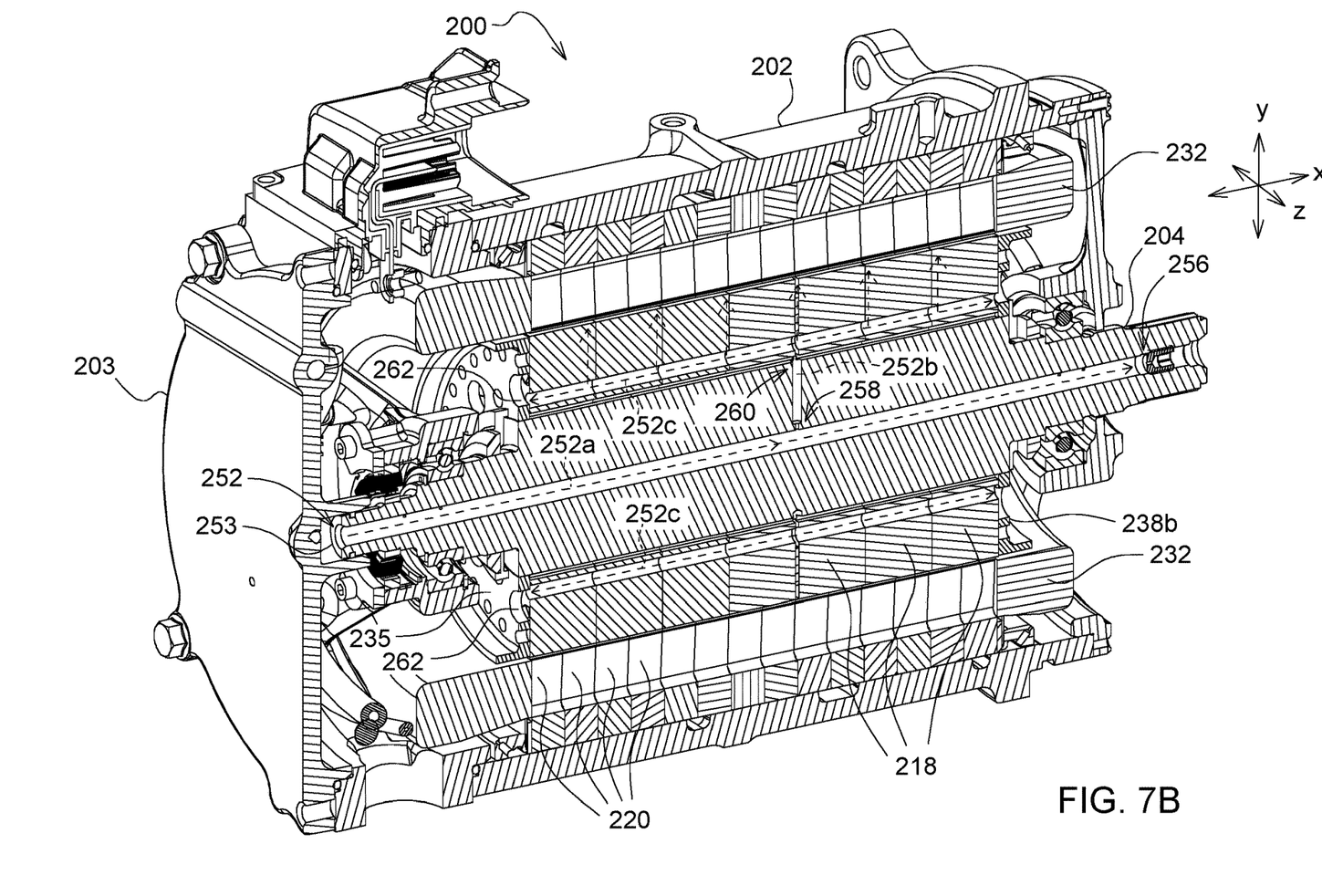
FIG. 7B is a perspective cross-sectional view of an electric machine according to an embodiment.
Figure 8:
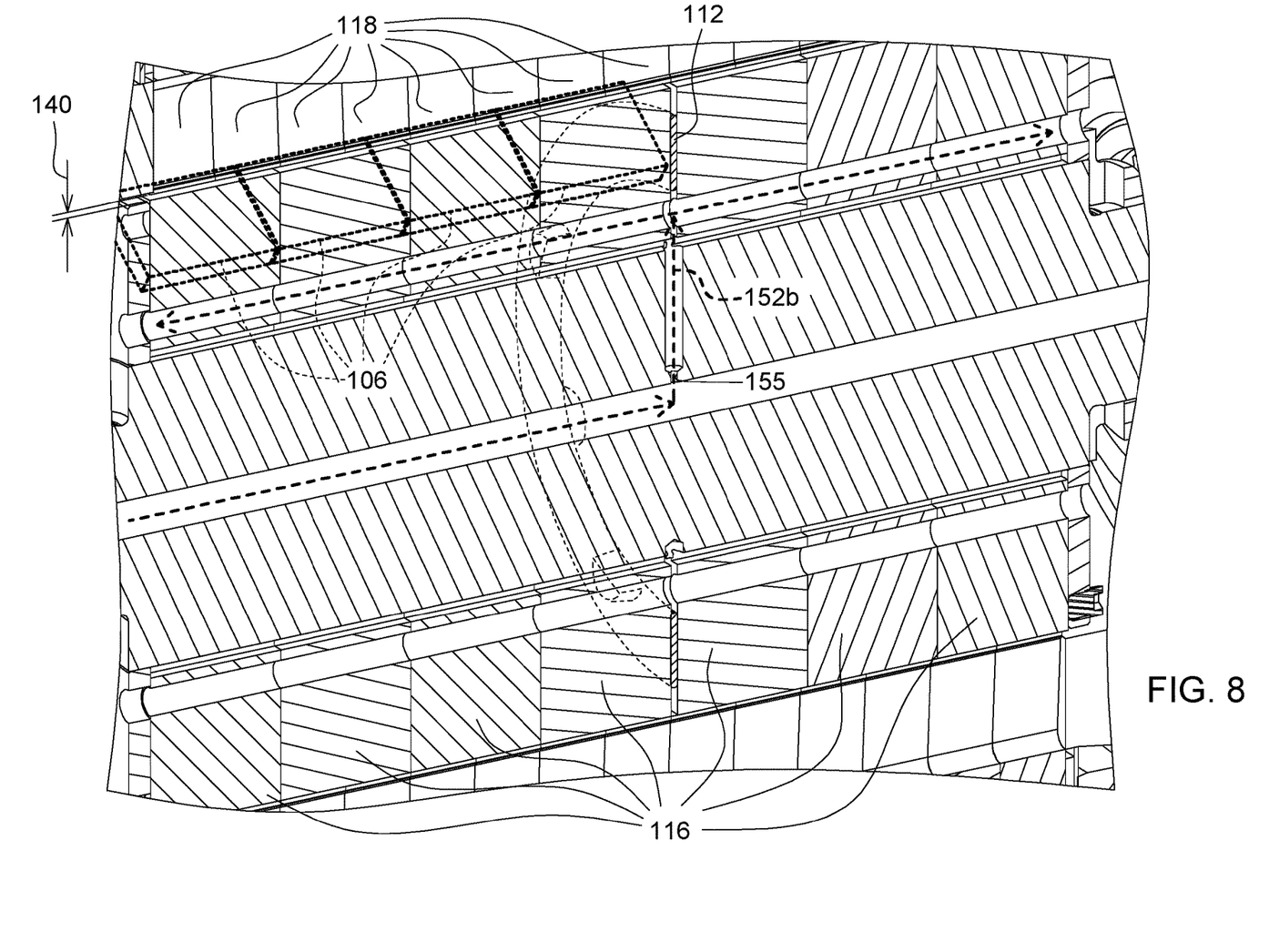
FIG. 8 is a side cross-sectional view of the electric machine of FIG. 1 according to an embodiment.

Referring now to FIGS. 6-8, a more detailed view of the cooling system 150 is shown. In some embodiments, the plurality of cooling passages 152 can comprise a first passage 152a, a second passage 152b, and a third passage 152c, which are intersectionally arranged to define a continuous flow path through the electric machine 100. The first passage 152a can be arranged to extend axially, relative to the center axis 101, along a partial or full length of the rotor shaft 104 between a first end 154 and a second end 156 in some embodiments. At the first end 154, the first passage 152a can receive a supply of coolant from an inlet 153 arranged in a rear cover 103 of the housing 102 (FIG. 5). The supply of coolant moves through the rotor shaft 104 in a first direction (e.g., an x-direction) and is distributed to the second passage 152b via an orifice 155 at the second end 156.

In some embodiments, the second passage 152b can be centrally arranged to extend radially through the rotor shaft 104 in a second direction orthogonal to the first direction. For example, in some embodiments, the second passage 152b can be arranged to extend through at least one sidewall of the rotor shaft 104 in a direction (e.g., y-direction) generally perpendicular to the center axis 101. In other embodiments, the direction and/or angular orientation of the second passage may vary according to application and specification requirements. As shown in FIG. 6, the second passage 152b can be arranged to communicate with the first passage 152a at a receiving end 158 and the third passage 152c at a distributing end 160. For example, the second passage 152b can be arranged such that coolant received from the receiving end 158 is directed into the third passage 152c for distribution through the plurality of rotor laminations 118 at the distributing end 160.

In some embodiments, the width and length of the second passage 152b can be sized generally less than each of the first and third passages 152a, 152c to allow for more controlled flow distribution. Additionally, although in embodiments discussed herein, the second passage 152b is shown as being centrally arranged on one side of the rotor shaft 104, it should be noted that, in other embodiments, the position and orientation of the second passage 152b may vary. For example, in other embodiments, the second passage 152b can be arranged on opposing sides of the rotor shaft 104, and/or its channel size and length can be increased or decreased. In still other embodiments, the second passage 152b can comprise two or more passages relatively arranged to extend in a radial or axial direction of the rotor shaft 104.

The third passage 152c can be arranged to extend in a third direction, which, in some embodiments, may also be orthogonal to the second direction, through the plurality of rotor laminations 118. The third passage 152c can comprise a plurality of coaxially aligned apertures 132 that are arranged in each of the plurality of rotor laminations 118 to form the continuous flow passage (i.e., third passage 152c). Additionally, referring now back to FIG. 4, in some embodiments, the third passage 152c can comprise a plurality of passages equidistantly spaced relative to one another in a generally circular configuration about the rotor assembly 108. In other embodiments, the third passage 152c can be formed as an integral channel and may also be arranged in various positional and/or angular orientations, with embodiments herein being merely exemplary embodiments.

The arrangement of third passage 152c is particularly advantageous in that it allows for the coolant to be distributed through the rotor laminations 118 and to the magnetic elements 106 arranged in the cavities 125a, 125b. For example, as coolant exits the second passage 152b and enters the third passage 152c, the spacer disc 116 is arranged such that radial flow of coolant from the third passage 152c is impeded and directed into each of the apertures 132 to allow for cooling of the magnetic elements 106 as shown in FIG. 8.

Additionally, referring now to FIGS. 6-7B, the cooling is further enhanced due to the arrangement of the cooling plates 138a, 138b. For example, as previously discussed, the alignment and mating engagement of the cooling plates 138a, 138b with the rotor core 107 (i.e., plurality of rotor laminations 118) allows for coolant to be directed to the end turns 142 as it exits the third passage 152b via the apertures 132. In some embodiments, each of the cooling plates 138a, 138b can comprise a thin plate such as that shown in FIG. 6. In other embodiments, the cooling plates can include cooling plates 238a, 238b, each having a lipped portion 270, apertures/openings 262, 264, 266, and a shaft opening 268 that is sized to encircle the rotor shaft 204 as shown in FIGS. 7A and 7B. The lipped portion 270 can be designed to extend outwardly and away from an outer periphery of each of the cooling plates 238a, 238b, and may vary in length in various embodiments. For example, in some embodiments, the length of the lipped portion 270 can be decreased or extended to change the location at which coolant exiting the third passage 152c strikes the end turn 142.

As shown in FIGS. 6 and 7B, a plurality of external flow passages as indicated by the arrows 166 can be arranged in fluid communication with the third passage 152c to provide a path for coolant to flow from the third passage 152c to the plurality of stator laminations 120 via an air gap 140. This, in turn, minimizes the amount of coolant distributed to the stator laminations 120 while allowing for some leakage to occur.

Without in any way limiting the scope, interpretation, or application of the claims appearing below, a technical effect of one or more of the example embodiments disclosed herein is a cooling system and method for an electric machine. The cooling system is particularly advantageous in that it allows for distributed cooling of the electric machine to dissipate heat accumulated in the electric machine and to improve machine performance.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An electric machine with distributed cooling, the electric machine comprising:
   a stator assembly;
   a rotor assembly comprising a rotor shaft and a rotor core; and
   a distributed cooling system comprising:
      at least one inlet arranged on an end of the rotor shaft;
      a first passage extending axially in a first direction through at least a portion of the rotor shaft, wherein the first passage is configured to direct a flow of coolant received from the inlet in the first direction;
      a second passage fluidly coupled to the first passage, the second passage extending radially in a second direction through at least a portion of the rotor shaft between a receiving end and a distributing end, wherein the second passage is configured to direct the flow of coolant in the second direction for distribution at the distributing end; and at least one third passage fluidly coupled to the second passage, the at least one third passage comprising aligned openings in a plurality of rotor laminations of the rotor assembly, the at least one third passage extending axially between a first end and a second end of the rotor assembly, wherein each third passage is configured to distribute bi-directionally coolant, received from the second passage, to the first end and the second end of the rotor assembly and to the stator assembly; wherein a spacer disc is removably or integrally coupled to an end face of each of the plurality of rotor laminations within the rotor core, and wherein the spacer disc is configured to direct radial distribution of coolant from the at least on third passage to provide coolant to one or more magnetic elements.

2. The electric machine of claim 1, wherein the rotor core comprises the rotor laminations arranged in stacked relation to one another with each of the rotor laminations having a center opening sized to receive a rotor shaft.

3. The electric machine of claim 2, wherein each of the plurality of rotor laminations comprises one or more field generation structures having cavities sized to receive the one or more magnetic elements.

4. The electric machine of claim 1, wherein the second direction is orthogonal to the first direction and the third direction.

5. The electric machine of claim 1, wherein the at least one third passage is defined by at least two or more coaxially aligned apertures respectively arranged in adjacent laminations of the plurality of rotor laminations, and wherein the at least one comprises a plurality of third passages.

6. The electric machine of claim 1, wherein the rotor assembly further comprises at least two cooling plates arranged at opposing ends of the rotor assembly, and wherein the at least two cooling plates comprise one or more apertures arranged in axial alignment with the third passage such that coolant exiting the third passage is directed to one or more end turns arranged in the stator assembly.

7. The electric machine of claim 6, wherein each of the at least two cooling plates further comprises a lipped portion that extends outwardly and away from an outer periphery of each of the cooling plates.

8. The electric machine according to claim 1 wherein the first passage extends axially along a full length of the rotor shaft between a first end and a second end of the rotor shaft to support a flow of coolant through the rotor shaft.

9. A work vehicle, the work vehicle comprising:
a vehicle frame;
an engine;
a transmission; and
an electric machine operatively coupled to the transmission, the electric machine comprising a stator assembly, a rotor assembly having a rotor core and a rotor shaft, and a distributed cooling system;
the distributed cooling system comprising:
at least one inlet arranged on an end of the rotor shaft;
a first passage extending axially in a first direction through at least a portion of the rotor shaft, wherein the first passage is configured to direct a flow of coolant received from the inlet in the first direction;
a second passage fluidly coupled to the first passage, the second passage extending radially in a second direction through at least a portion of the rotor shaft between a receiving end and a distributing end, wherein the second passage is configured to direct the flow of coolant in the second direction for distribution at the distributing end; and at least one third passage fluidly coupled to the second passage, the at least one third passage comprising aligned openings in a plurality of rotor laminations of the rotor assembly, the at least one third passage extending axially between a first end and a second end of the rotor assembly, wherein each third passage is configured to distribute bi-directionally coolant, received from the second passage, to at least one of the first end or the second end of the rotor assembly and to the stator assembly, wherein a spacer disc is removably or integrally coupled to an end face of each of the plurality of rotor laminations within the rotor core, and wherein the spacer disc is configured to direct radial distribution of coolant from the at least on third passage to provide coolant to one or more magnetic elements.

10. The work vehicle of claim 9, wherein the rotor core comprises the plurality of rotor laminations arranged in stacked relation to one another with each of the rotor laminations having a center opening sized to receive a rotor shaft.

11. The work vehicle of claim 10, wherein each of the plurality of rotor laminations comprises one or more field generation structures having cavities sized to receive the one or more magnetic elements.

12. The work vehicle of claim 9, wherein the at least one third passage is defined by at least two or more coaxially aligned apertures respectively arranged in adjacent laminations of the plurality of rotor laminations, and wherein the at least one comprises a plurality of third passages.

13. The work vehicle of claim 9, wherein the rotor assembly further comprises at least two cooling plates arranged at opposing ends of the rotor assembly, and wherein the at least two cooling plates comprise one or more apertures arranged in axial alignment with the third passage such that coolant exiting the third passage is directed to one or more end turns arranged in the stator assembly.

14. The work vehicle of claim 13, wherein each of the at least two cooling plates further comprises a lipped portion that extends outwardly and away from an outer periphery of each of the cooling plates.

15. A method, the method comprising:
providing a stator assembly and a rotor assembly within a housing, the rotor assembly having a rotor core relatively arranged with respect to a rotor shaft;
arranging a first passage to extend axially in a first direction through the rotor shaft to direct a flow of coolant in the first direction;
arranging a second passage in fluid communication with the first passage to extend in a second direction through the rotor shaft between a receiving end and a distributing end, wherein the second passage is configured to direct the flow of coolant in the second direction;
arranging a third passage in the rotor core in fluid communication with the second passage to extend axially between a first end and a second end through the rotor core, wherein the third passage is configured to distribute bi-directionally coolant, received from the second passage, to the first end and the second end of the rotor assembly and to the stator assembly; and
coupling a spacer disc to the rotor core, wherein the spacer disc is configured to direct radial distribution of coolant from the third passage to provide coolant to one or more magnetic elements arranged in the rotor core.

16. The method of claim 15, wherein the third passage is defined by at least two or more coaxially aligned apertures respectively arranged in adjacent laminations of the plurality of rotor laminations.

17. The method of claim 15, wherein the rotor assembly further comprises at least two cooling plates arranged at opposing ends of the rotor assembly, and wherein the at least two cooling plates comprise one or more apertures arranged in axial alignment with the third passage such that coolant exiting the third passage is directed to one or more end turns arranged in the stator assembly.

18. The method of claim 17, wherein each of the at least two cooling plates further comprises a lipped portion that extends outwardly and away from an outer periphery of each of the cooling plates.

\* \* \* \* \*